(12) United States Patent
Iyer et al.

(10) Patent No.: US 9,596,108 B2
(45) Date of Patent: Mar. 14, 2017

(54) METHOD AND APPARATUS FOR BAUD-RATE TIMING RECOVERY

(71) Applicant: INTEL CORPORATION, Santa Clara, CA (US)

(72) Inventors: Sitaraman V. Iyer, San Jose, CA (US); Fulvio Spagna, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/292,743

(22) Filed: May 30, 2014

(65) Prior Publication Data

US 2015/0349991 A1    Dec. 3, 2015

(51) Int. Cl.
*H04L 25/03* (2006.01)
*H04L 7/00* (2006.01)

(52) U.S. Cl.
CPC ...... *H04L 25/03949* (2013.01); *H04L 7/0062* (2013.01); *H04L 25/03146* (2013.01)

(58) Field of Classification Search
CPC .. H03D 1/04; H03D 3/24; H03H 7/00; H03H 7/30; H03H 7/40; H03K 3/00; H03K 5/159; H03K 9/00; H04B 1/10; H04B 1/38; H04B 10/06; H04J 14/00; H04J 15/00; H04L 7/00; H04L 7/08; H04L 25/03; H04L 25/03885; H04L 25/062; H04L 25/49; H04L 27/00; H04L 27/01; H04L 27/06; H04L 27/18; H04L 25/03949

USPC ........ 327/147, 156, 158, 199, 217; 341/155; 370/249, 395, 464; 375/219, 229, 231, 375/232, 233, 316, 340, 345, 348, 355; 708/300, 303; 713/500
See application file for complete search history.

(56) References Cited

U.S. PATENT DOCUMENTS

| | | | |
|---|---|---|---|
| 7,489,749 B2 | 2/2009 | Liu | |
| 2005/0185742 A1* | 8/2005 | Liu | ................................. 375/348 |
| 2008/0240318 A1* | 10/2008 | Shoor et al. | .................. 375/355 |
| 2010/0135378 A1* | 6/2010 | Lin | ........................ H04L 7/0025 375/233 |
| 2012/0207204 A1* | 8/2012 | Hidaka | ............. H04L 25/03057 375/233 |
| 2012/0257652 A1* | 10/2012 | Malipatil | .............. H04L 7/0062 375/219 |
| 2015/0016497 A1* | 1/2015 | Aziz | ................. H04L 25/03057 375/233 |

(Continued)

FOREIGN PATENT DOCUMENTS

| | | |
|---|---|---|
| TW | 201145955 | 12/2011 |
| TW | 201312981 | 3/2013 |
| TW | M449413 | 3/2013 |

OTHER PUBLICATIONS

Office Action and Search Report for counterpart Taiwan Application No. 104113042, 16 pages, mailed Jul. 7, 2016 including translation.

*Primary Examiner* — Shawkat M Ali
(74) *Attorney, Agent, or Firm* — Blakely, Sokoloff, Taylor & Zafman LLP

(57) ABSTRACT

Described is an apparatus which comprises: a Decision Feedback Equalizer (DFE); and a phase detector, operationally coupled to the DFE, to set a sampling phase based on a first post-cursor value of a composite pulse response being substantially equal to zero when the phase detector collects data bits having current bit and next bit such that value of the current bit is unequal to a value of the next bit.

19 Claims, 7 Drawing Sheets

(56) References Cited

U.S. PATENT DOCUMENTS

2015/0188693 A1* 7/2015 Giaconi ................ H04L 7/0041
375/233
2016/0127155 A1* 5/2016 Johnson ............ H04L 25/03878
375/233

* cited by examiner

METHOD AND APPARATUS FOR BAUD-RATE TIMING RECOVERY

BACKGROUND

Baud rate (i.e., sampling at data rate) phase detectors are used widely in high speed serial links (e.g., links with data rates greater than 8 Gb/s) due to better power, less complexity and area usage compared to oversampling based timing recovery. However, the commonly used timing function, which is generally referred to as the Mueller-Muller phase detector based timing function, may require strong pre-emphasis to be applied on the signal either in the transmitter or the receiver, to drive the Inter-Symbol Interference (ISI) from the first pre-cursor to zero thereby providing a strong timing lock. Here, timing lock refers to positioning the sampling clock edge in a way which affords maximum tolerance to input jitter.

The left-right centering (i.e., horizontal centering) of the sampling clock edge position within the received data eye is a strong function of the pre-emphasis. For high loss channels, where de-emphasis may be required in addition to pre-emphasis, the resulting data eye margins may be limited by the maximum boost (i.e., combination of pre-emphasis and de-emphasis) that can be applied and by the available gain of the receiver since high gain and high bandwidth are difficult to achieve in highly scaled CMOS processes. Therefore, a baud rate sampling method that does not require as much pre-emphasis and that can tolerate a non-zero first precursor ISI and not require additional gain, is highly desirable.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1:
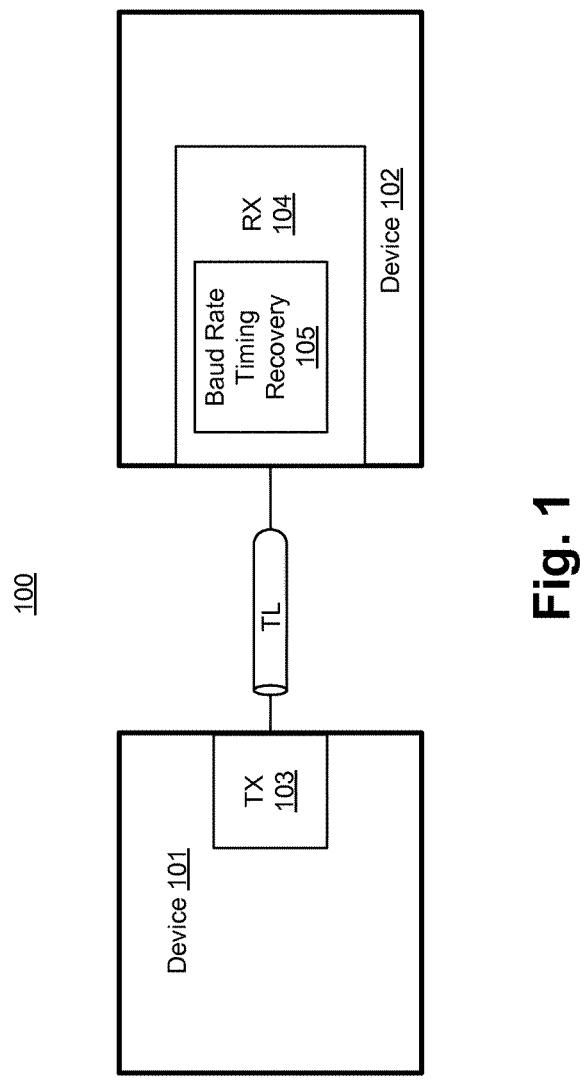
FIG. 1 illustrates a computing system with a receiver having apparatus for baud rate timing recovery, according to one embodiment of the disclosure.

Some embodiments describe a receiver having a modified Mueller-Muller Type B (MMB) phase detector where phase information is collected from those sampled data bits where the current bit is not equal to the next bit in the data bit sequence. In one embodiment, a method is provided to set the value of the first post cursor tap of the Decision Feedback Equalizer (DFE) such that the difference of the cursor and the precursor is maximized (i.e. increased). In one embodiment, a control loop is provided to manage the adaptation sequence such that Mueller-Muller Type A (MMA) phase detector is used to set up the initial conditions for eventual operation with the modified MMB phase detector. While the embodiments are described with reference to Mueller-Muller Type phase detectors, other types of phase detectors may be used according to various aspects of the embodiments.

In one embodiment, an apparatus is provided which comprises a DFE and a phase detector operationally coupled to the DFE. In one embodiment, the phase detector collects at least three data bits, having current bit and next bit such that value of the current bit is unequal to a value of the next bit. In one embodiment, the phase detector sets a sampling phase based on the first post-cursor value of the composite pulse response being substantially equal to zero. In one embodiment, the third data bit is a previous bit which is used to determine the direction of the phase detector output. In one embodiment, the apparatus further comprises logic to initialize the value of the first tap of the DFE (henceforth referred to as DFE1) to a non-zero value. In one embodiment, the logic is operable to control DFE1 when the phase detector is enabled. In one embodiment, the logic is operable to determine DFE1. In one embodiment, the logic is operable to determine DFE1 using at least one of: SS-LMS (Sign-Sign Least Mean Square); bit error based zero-forcing, or Means Square Error. In one embodiment, the phase detector generates a timing error estimate which is subject to a filtering factor which is represented by a difference between the current bit and the next bit.

In one embodiment, the apparatus further comprises another phase detector to set an initial sampling phase based on equating the pulse response precursor and post-cursor values of the composite pulse response. In one embodiment, the other phase detector is used to generate a timing error estimate which is of MMA timing error estimate or a Qureshi timing error estimate. In one embodiment, the apparatus further comprises logic to sequence operation of the clock data recovery such that the other phase detector operates prior to operation of the phase detector. In one embodiment, the phase detector generates a timing error estimate which is a modified MMB timing error estimate.

The embodiments result in a number of improvements over the conventional baud rate phase detection method including: clock and data recovery with much reduced or even pre-emphasis absence; better horizontal centering of the sampling edge position in the eye; and lower requirements for the receiver gain. These exemplary advantages over the conventional baud rate phase detection enable power, area and complexity benefits of baud rate phase detection to be used for serial links (e.g., Peripheral Component Interface Express (PCIe)) operating in high loss channels (e.g., channels with loss greater than 30 dB).

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical connection between the things that are connected, without any intermediary devices. The term "coupled" means either a direct electrical connection between the things that are connected or an indirect connection through one or more passive or active intermediary devices. The term "circuit" means one or more passive and/or active components that are arranged to cooperate with one another to provide a desired function. The term "signal" means at least one current signal, voltage signal or data/clock signal. The meaning of "a," "an," and "the" include plural references. The meaning of "in" includes "in" and "on."

The term "scaling" generally refers to converting a design (schematic and layout) from one process technology to another process technology. The term "scaling" generally also refers to downsizing layout and devices within the same technology node. The term "scaling" may also refer to adjusting (e.g., slow down) of a signal frequency relative to another parameter, for example, power supply level. The terms "substantially," "close," "approximately," "near," and "about," generally refer to being within +/−20% of a target value.

Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For purposes of the embodiments, the transistors are metal oxide semiconductor (MOS) transistors, which include drain, source, gate, and bulk terminals. The transistors also include Tri-Gate and FinFET transistors, Gate All Around Cylindrical Transistors or other devices implementing transistor functionality like carbon nanotubes or spintronic devices. Source and drain terminals may be identical terminals and are interchangeably used herein. Those skilled in the art will appreciate that other transistors, for example, Bi-polar junction transistors—BJT PNP/NPN, BiCMOS, CMOS, eFET, etc., may be used without departing from the scope of the disclosure. The term "MN" indicates an n-type transistor (e.g., NMOS, NPN BJT, etc.) and the term "MP" indicates a p-type transistor (e.g., PMOS, PNP BJT, etc.).

FIG. 1 illustrates a computing system 100 with a receiver having apparatus for baud rate timing recovery, according to one embodiment of the disclosure. In one embodiment, computing system 100 comprises Device 101, Device 102, and transmission line (TL). Device 101 includes a transmitter (TX) 103 to transmit data over the TL to receiver (RX) 104 of Device 102. In one embodiment, RX 104 includes apparatus for Baud Rate Timing Recovery 105.

In one embodiment, Baud Rate Timing Recovery 105 includes: a DFE and a second phase detector (e.g., MMA phase detector, also referred here as the "other" phase detector) to collect at least two data bits D, having a current bit $D_k$ and a previous bit $D_{k-1}$, and to set an initial sampling phase based on equating the composite pulse response pre-cursor and post-cursor values. In one embodiment, Baud Rate Timing Recovery 105 further comprises a first phase detector (e.g., modified MMB phase detector) which is operationally coupled to the DFE. In one embodiment, the first phase detector collects the at least three data bits, such that value of the current bit $D_k$ is unequal to a value of a next bit $D_{k+1}$. In one embodiment, the third data bit is used to determine the direction of the phase detector output. In one embodiment, the first phase detector sets a sampling phase based on the composite pulse response post-cursor value being substantially equal to zero. In one embodiment, the apparatus further comprises logic to control DFE1 when the first phase detector is enabled such that there exists at least a sampling point on the pulse response where the first post-cursor is substantially zero (or zero).

Figure 2:
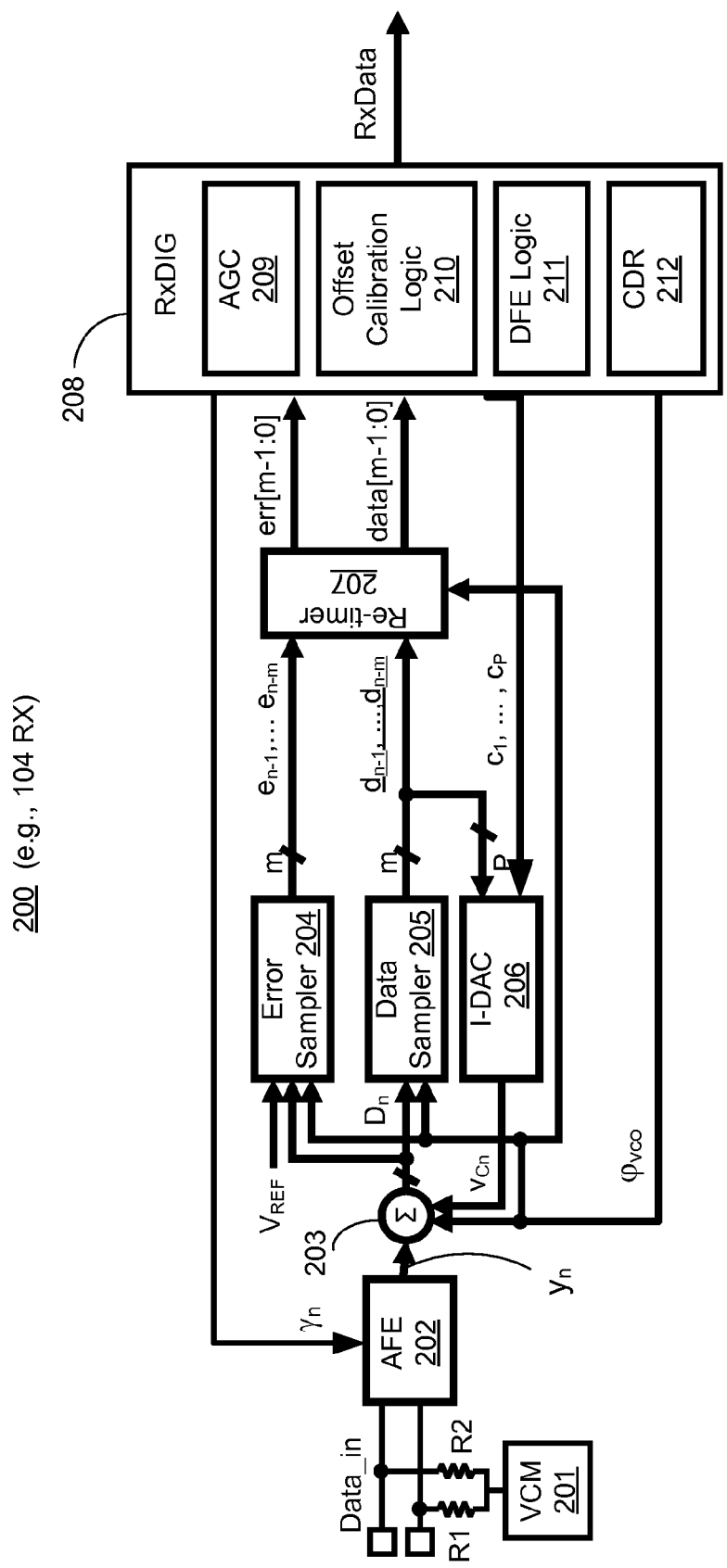
FIG. 2 illustrates a receiver with apparatus for baud rate timing recovery, according to one embodiment of the disclosure.

FIG. 2 illustrates a receiver 200 (e.g., RX 104) with apparatus for baud rate timing recovery, according to one embodiment of the disclosure. It is pointed out that those elements of FIG. 2 having the same reference numbers (or names) as the elements of any other figure can operate or function in any manner similar to that described, but are not limited to such.

In one embodiment, receiver 200 comprises an analog portion having voltage common mode block (VCM) 201, resistors R1 and R2, analog front end (AFE) 202, integrator 203, Error Sampler 204, Data Sampler 205; current digital to analog converter (I-DAC) 206; and Re-timer 207. In one embodiment, receiver 200 comprises a digital portion RxDig 208 which includes apparatus for baud rate timing recovery. In one embodiment, RxDig 208 includes analog gain control (AGC) logic 209, Offset Calibration logic 210, DFE logic 211, and clock data recovery CDR logic 212.

Here are few symbols and abbreviations that are used in this disclosure: "CDR" refers to Clock Data Recovery; "DFE" refers to Decision Feedback Equalization; "SS-LMS" refers to Sign-Sign Least Mean Squares; "DFE1" refers to value of the first post-cursor DFE tap; "Vref" refers to reference voltage used to generate the error samples. It is also referred to as the "Target Signal Magnitude;" "$D_n$" refers to the value of the nth analog data sample; "$E_n = |D_n| -$ Vref" refers to the difference between the nth analog data sample and the Target Signal Magnitude; "$d_n$" refers to sign of the nth sample; "$e_n$" refers to sign of the error of the nth sample; "$\phi_n$" refers to phase error from the nth sample; "$h_0$" refers to cursor value of the composite pulse response (e.g., transmitter finite impulse response, channel, receiver linear equalization, and receiver DFE); "$h_1$" refers to first post-cursor value of the composite pulse response; "$h_{-1}$" refers to first precursor value of the composite pulse response; and "h(t)" refers to composite pulse response as a function of time.

In one embodiment, Data_in is received from TX 103 over TL by AFE 202. In one embodiment, VCM 201 sets common mode of differential signal Data_in before data is received by an amplifier (not shown) of AFE 202. In one embodiment, AGC 209 controls the gain of the amplifier by means of a control signal $\gamma_n$. In one embodiment, the data recovered by AFE 202 is sampled and integrated over time by summer 203 to generate error samples e[m−1:0] and data samples d[m−1:0] which are then used by RxDIG 208 to recover clock and adjust the sampling clock edge position, henceforth referred to as $\Phi_{VCO}$, substantially in the middle of the data eye.

In one embodiment, Data Sampler 205 samples the output $y_n$ of AFE 202, to generate 'm' data samples (i.e., $d_{n-1} \ldots d_{n-m}$). In one embodiment, Error Sampler 204 compares the current AFE output $y_n$ against Vref to generate 'm' error samples (i.e., $e_{n-1}, \ldots e_{n-m}$). In one embodiment, I-DAC 206 receives "P-1" control bits $c_1$ to $c_P$ from Offset Calibration logic 210 to generate voltage $V_{C_n}$ for cancelling the ISI present in the signal $y_n$ at the output of AFE 202, where "P," "m," and 'n' are integers. FIG. 2 is described with reference to FIGS. 3-6.

Figure 3:
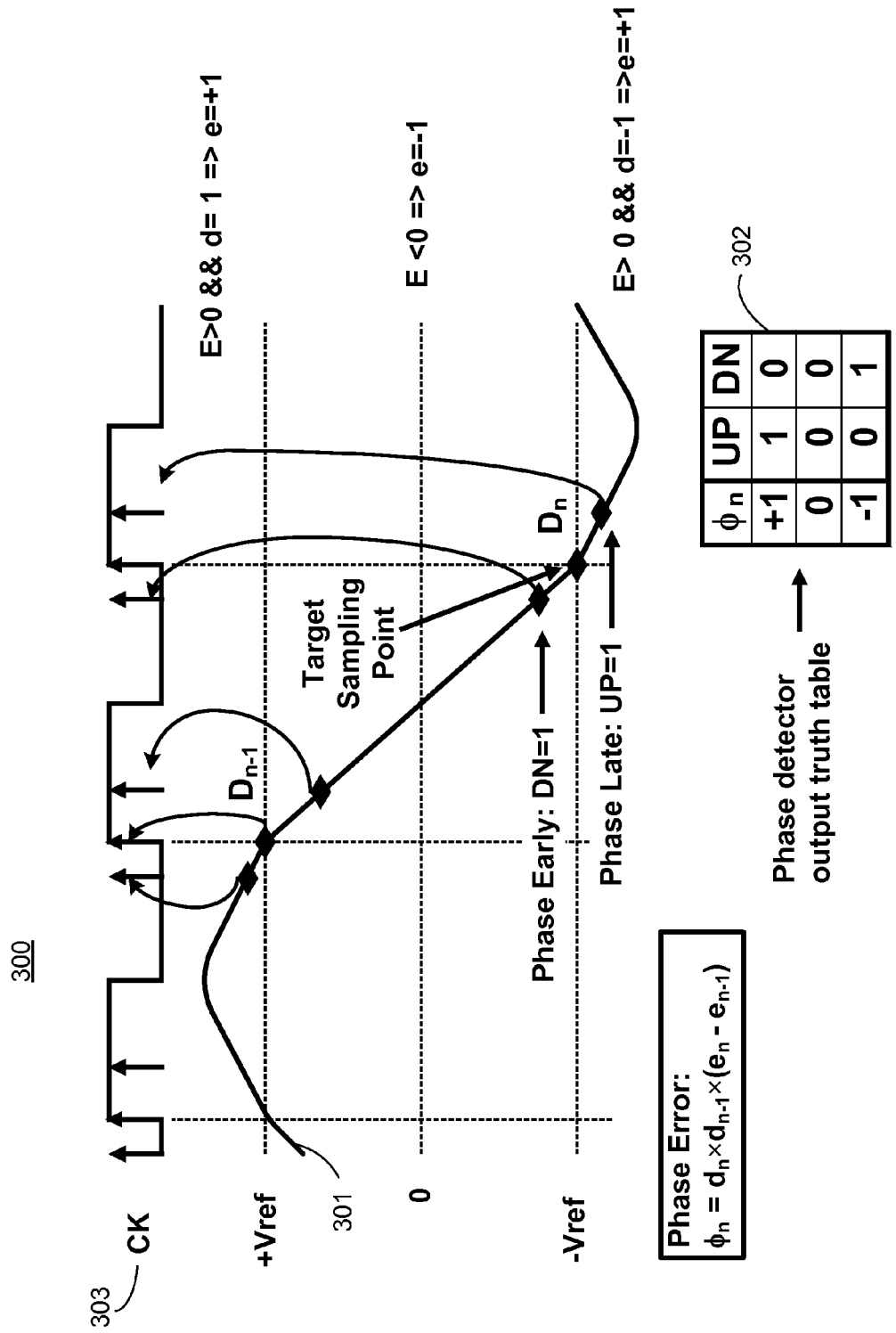
FIG. 3 illustrates a plot showing clock edge positioning using Mueller-Muller Type A phase detector.

FIG. 3 illustrates a plot 300 showing clock edge positioning using MMA phase detector. It is pointed out that those elements of FIG. 3 having the same reference numbers (or names) as the elements of any other figure can operate or function in any manner similar to that described, but are not limited to such.

Here, x-axis is time, and y-axis is voltage. Waveform 301 is the output of AFE 202 and input to Error Sampler 204. When the data sample $D_n$ (i.e., waveform 301) is above +Vref, E (i.e., error) is positive and $e_n$ is equal to "+1." When the data sample $D_n$ (i.e., waveform 301) is below +Vref and above zero, E is negative and $e_n$ is equal to "−1." When the data sample $D_n$ (i.e., waveform 301) is below 0 and above −Vref, E is negative and $e_n$ is equal to "−1." When the data sample $D_n$ (i.e., waveform 301) is below −Vref, E is positive and $e_n$ is equal to "+1." The waveform 303 CK shows the various sampling edge positions to capture data. The table 302 in FIG. 3 shows the truth table of the second phase detector (e.g., MMA phase detector) according to which the phase error is computed as $$\phi_n = \text{sign}(D_{n-1}) * \text{sign}(D_n) * (0.5 * |\text{sign}(E_n) - \text{sign}(E_{n-1})|)$$

where e=sign(E).

Referring back to FIG. 2, in one embodiment, MMA phase detector (which is part of CDR 212) is used to set up initial conditions. In one embodiment, MMA phase detector collects at least two data bits, having a current bit and a previous bit, and sets an initial sampling phase based on equating impulse response pre-cursor value and post-cursor value of DFE 211. In one embodiment, MMA phase detector adjusts the sampling phase so that the ISI from the first precursor and the first post-cursor taps are equal:

$$h_1 - h_{-1} = 0$$

In one embodiment, after initial conditions for initial sampling phase set by a MMA phase detector, modified MMB phase detector (which is part of CDR 212) begins operation where phase information is collected from those sampled data bits where the current bit is not equal to the next bit in the bit sequence:

$$\phi_n = \text{sign}(D_{n-1})\text{sign}(D_n)\text{sign}(E_n) * (0.5 * |\text{sign}(D_n) - \text{sign}(D_{n+1})|)$$

In one embodiment, logic (which may be part of CDR 212) is operable to set DFE1 of DFE 211 such that the difference of the cursor and the precursor is maximized (i.e., increased). In one embodiment, the modified MMB phase detector collects at least three data bits, such that value of the current bit is unequal to a value of a next bit. In one embodiment, the modified MMB phase detector sets a sampling phase based on the value of the first post-cursor of the composite pulse response being substantially equal to zero. Here, the ISI due to the first post-cursor provides feedback on timing when the sampling position moves away from the locked position so that the timing function equilibrium point can be expressed in terms of the composite pulse response as:

$$h_1 = 0$$

In a typical serial link, in which DFE1 is driven to zero by DFE 211, the MMB timing function may not be usable because the criteria for the timing (CDR) and first post-cursor cancellation (DFE1) are basically the same, leading to an underdetermined problem. In some embodiments, alternate methods to set DFE1 are introduced that allow the usage of the MMB timing function even in a system with first post-cursor DFE. In such an embodiment, the MMB timing function (obtained from modified MMB phase detector) can then be used to set the sampling position (i.e., clock edge position) without the requirement to have zero or small ISI from the first precursor. In this case, a change in the value of DFE1 while CDR 212 is at its locked position, results in an introduction of first post-cursor ISI, which provides timing feedback to CDR 212 loop thus forcing the sampling position to move towards bringing the first post-cursor ISI back to zero.

While the embodiments describe two examples of setting DFE1 coupled with modified MMB phase detector, any number of criteria can be used to set DFE1 coupled with the MMB timing function. One such example is when Vref tracks the median strength of all samples. In one such embodiment, probability p is first computed of those samples stronger than Vref, i.e., $E_n > 0$ and where $d_n = d_{n+1}$. In one embodiment, after computing probability p, DFE1 is set such that the probability p equals a predetermined constant as expressed as:

$$P(E_k > 0 | d_n = d_{n+1}) = p$$

In one embodiment, if DFE1 is set to make this probability p equal to 0.5, then the resultant clock edge sampling position is equivalent to that obtained from traditional MMA phase detector coupled with a zero forcing DFE1 control. In other words, the next bit does not have any net impact on the current bit. On the other hand, if probability p is set to be any value higher than 0.5, then the impact of precursor (next bit) is to add constructively to the cursor (current bit), i.e., the precursor ISI is greater than zero. This will result in the sampling position to be pushed later in time relative to the case where p=0.5.

Figure 6:
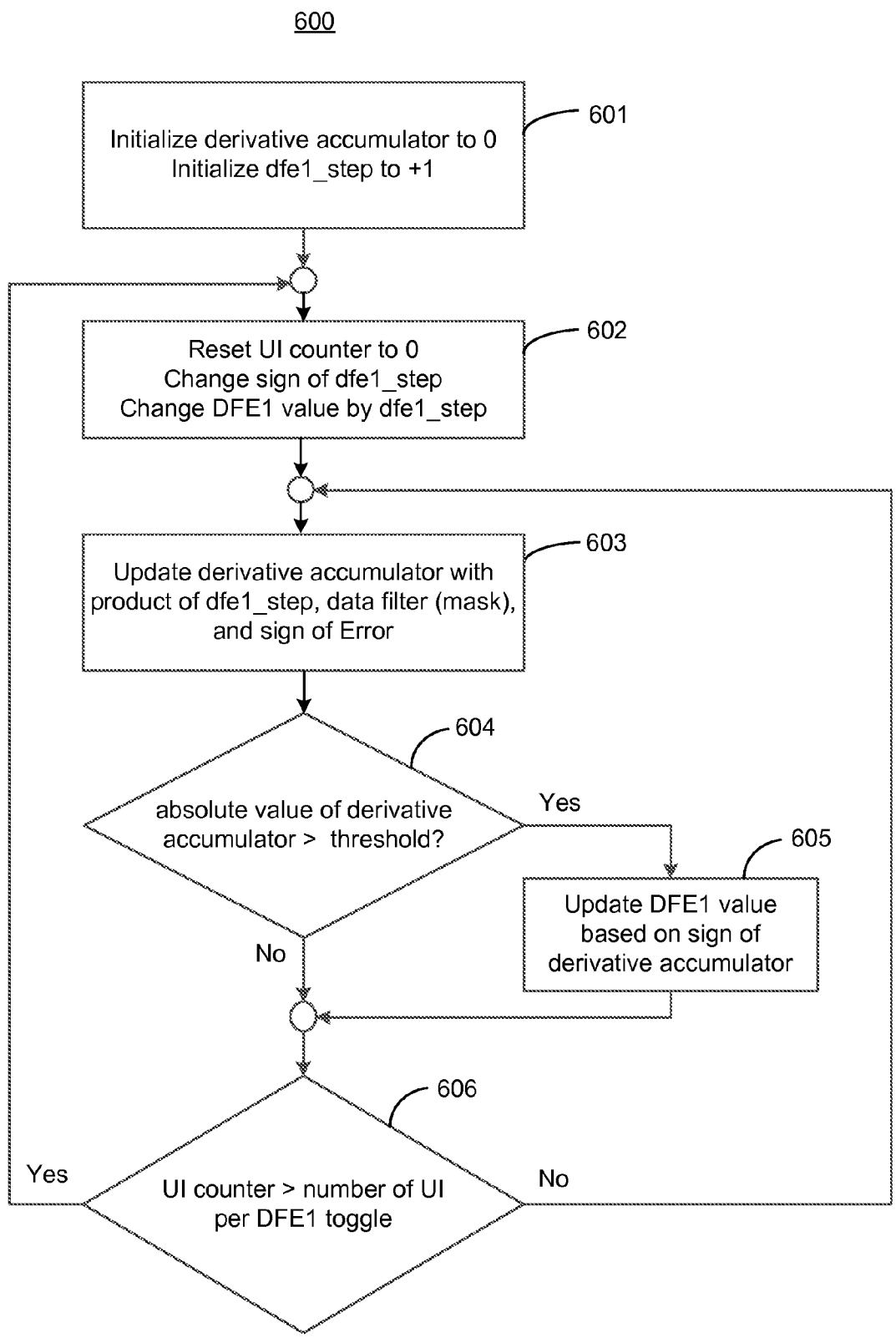
FIG. 6 illustrates a method flowchart for dynamically setting the value of the first tap of the DFE (DFE1) by computing the derivative of the difference between the cursor and the pre-cursor, according to one embodiment of the disclosure.

Another example is when Vref tracks the median strength of data samples where the next data bit is not equal to the current data bit, i.e., $d_n! = d_{n+1}$. In such an embodiment, using DFE1 as a knob to sweep the sampling position of the clock edge, DFE1 is set to a value where Vref is maximized (i.e., highest value in its range). This operation (i.e., derivative DFE) can expressed as:

$$\frac{d(h(t) - h(t - T_{UI}))}{dt} = 0$$

where, h(t) is the composite pulse response and $T_{UI}$ results in a time offset within a unit interval (UI). Assuming a linear relationship between the time $T_{UI}$ and the value of DFE1, assumption which is valid for small perturbations of the DFE1, the above derivative is implemented relative to the DFE1 value, according to one embodiment. FIG. 6 illustrates a method flowchart for derivative DFE based baud rate timing recovery, according to one embodiment of the disclosure.

Figure 4:
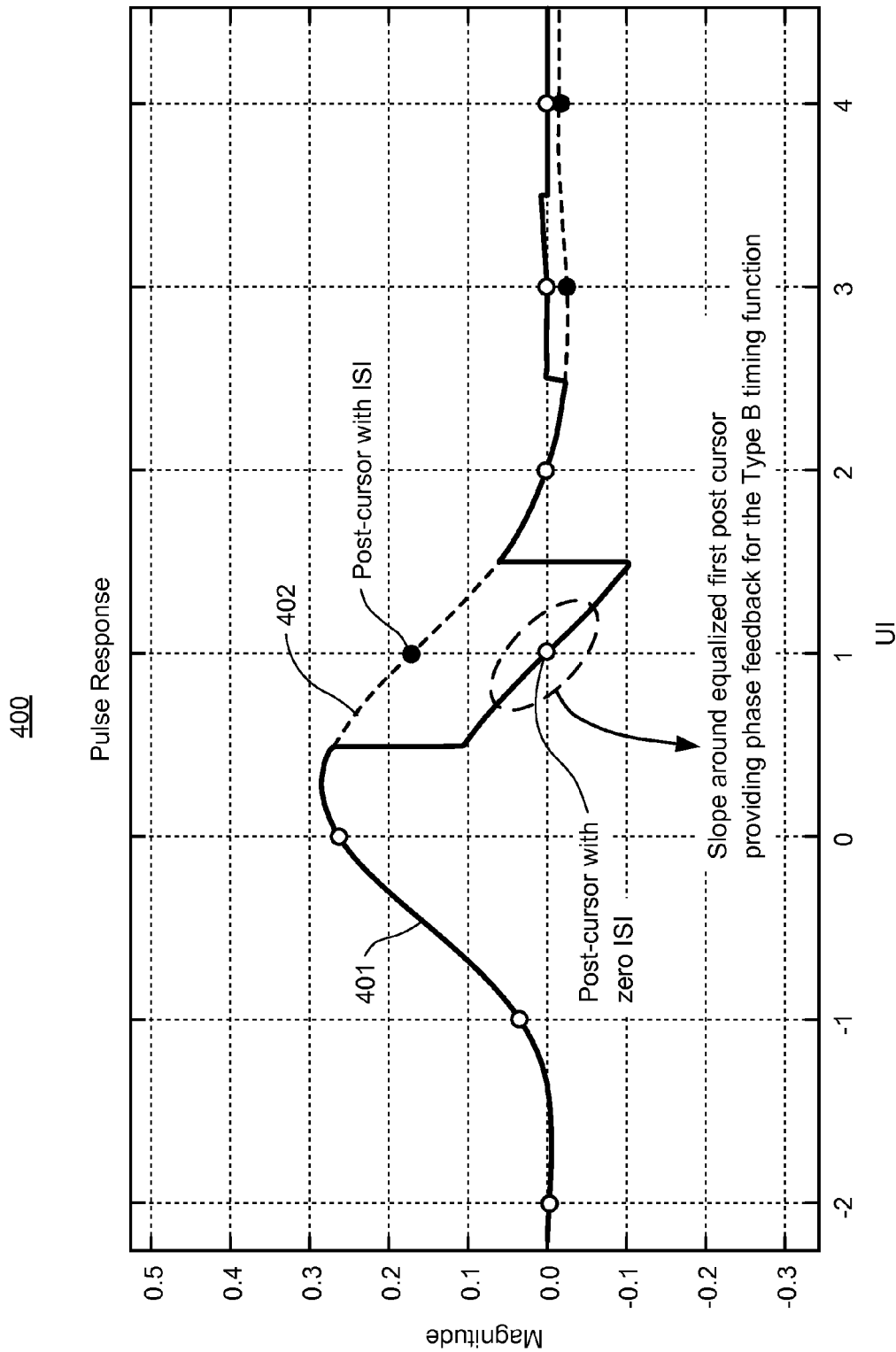
FIG. 4 illustrates a plot showing equalized composite pulse response of transmitter, channel, receiver front end, and receiver decision feedback equalizer, according to one embodiment.

FIG. 4 illustrates a plot 400 showing the composite pulse response of transmitter, channel, receiver front end, before and after the receiver decision feedback equalizer, according to one embodiment. It is pointed out that those elements of FIG. 4 having the same reference numbers (or names) as the elements of any other figure can operate or function in any manner similar to that described, but are not limited to such.

Here x-axis represents time as expressed in Unit Intervals (UI) of the incoming data Data_in, and y-axis is the signal magnitude due to a single transmitted pulse that is one UI wide. Plot 400 shows two waveforms superimposed on one another. The first waveform is waveform 401 and the second waveform is 402. Waveform 402 represents the link pulse response prior to DFE 211 correction. Here, waveform 401 represents the link pulse response after the DFE correction. The action of the DFE is clearly visible in the fact that the pulse response at the sample time is zero for the post-cursor terms.

Referring back to FIG. 2, in one embodiment, DFE1 is combined with a modified MMB phase detector where the sampled bit stream is filtered to limit the valid phase samples to those where the next bit is different from the current bit. In one embodiment, the same filtering can be implemented in a Vref tracking loop (which is a loop which tracks the amplitude of the pulse response cursor). In one embodiment, the idea of using the DFE1 to search for the clock edge sampling position with maximal Vref is extended to a dynamic implementation where the DFE1 is explicitly dithered, periodically, in order to estimate the derivative of the filtered pulse response: $h(t)-h(t-T_{UI})$. A flowchart depicting the algorithm for such a derivative computation is described with reference to FIG. 5 and FIG. 6.

Referring back to FIG. 2, when ordering of operations of locking CDR 212 and the DFE1 loops during initial loop acquisition, if the DFE1 value is initially 0, then for a majority of cases, there may be no valid sampling position and hence CDR 212 loop may not lock. Therefore, DFE1 being zero may not be a practical initial condition for clock edge acquisition. In one embodiment, the initial acquisition is done using the MMA timing function, followed by DFE1 acquisition using, for example, traditional SS-LMS updates. Upon completion of the initial acquisition, the timing function is switched to MMB, followed by a switch to the DFE1 algorithm shown in the flowchart. The composite adaptation sequence showing the state of the front end attenuator, Vref, CDR 212 and DFE1 and DFE2 control loops is summarized in Table 1.

TABLE 1

Adaptation Sequence with transition from MMA to modified MMB phase detector

| $T_{start}$ | $T_{end}$ | Vref TRACKS | CDR Timing Function | CDR 2nd ORDER LOOP | DFE1 |
|---|---|---|---|---|---|
| 0 | T0 | Cursor | MMA | ON | SS-LMS |
| T0 | T1 | Cursor-Precursor | Modified-MMB | OFF | FROZEN |
| T1 | T2 | Cursor-Precursor | Modified-MMB | ON | FROZEN |
| T2 | T3 | Cursor-Precursor | Modified-MMB | ON | DER FAST |
| T3 | — | Cursor-Precursor | Modified-MMB | ON | DER SLOW |

The first row, below the row of labels, indicates the time duration between time 0 to T0 where MMA phase detector performs the timing function, and DFE1 is computed using SS-LMS. SS-LMS is one of many methods for computing DFE1. In such an embodiment, second order loop of CDR 212 is turned ON and modified MMB phase detector remains OFF. Here, second order of CDR 212 loop refers to a control loop which has a second order loop filter. While the embodiments described a second order loop, higher order (e.g., third order) or lower order loops may also be used depending on the application. The first row, below the row of labels, is the initialization phase in which Vref tracks the cursor and zero-forcing is performed to compute DEFT. In such an embodiment, DFE1 initialized value is saved (i.e., frozen).

After DFE1 is computed using SS-LMS (same as zero forcing) and during time durations T0 to T1, modified MMB phase detector is turned ON and MMA is turned OFF. In this embodiment, Vref tracks the difference between cursor and precursor. In this embodiment, second order loop of CDR 212 is turned OFF. The DFE1 value remains the old value and modified MMB phase detector begins to compute the new sampling position $\Phi_{VCO}$. Between times T1 and T2, second order loop of CDR 212 is turned ON to track any frequency difference between the incoming data stream and the receiver reference clock. Between times T2 and T3, the DFE1 value is computed using the derivative method (e.g., flowchart 600 of FIG. 6) while the CDR 212 continues to update the sampling position based on the modified MMB phase detector timing function. This process continues and the clock edge is positioned using the DFE1 values (and high order DFE values) in the middle of the data eye.

Several technical effects are evident from the embodiments compared to known schemes. For example, the embodiments result in: higher eye margins and jitter tolerance; more flexibility to shift more equalization from pre-cursor to the post-cursor on the transmitter side, thereby reducing (for lower speeds, potentially completely eliminating) boost requirement from the transmitter side; more flexibility to operate without any transmit equalization for medium loss (e.g., 25 dB) channels and at higher speeds (e.g., 8 Gb/s), which is a benefit in certain applications such as when interfacing with transmitters that do not possess equalization capability; lower system gain requirement, translating to either lower requirements for receiver gain or the option to reduce the swing on the transmitter side, saving power and/or area; simpler phase detection i.e., no additional complexity in the high-speed, latency sensitive CDR 212 control loop; more flexibility to add more complex signal processing in the low-speed DFE1 control loop whose bandwidth is not as critical as the bandwidth of the CDR 212; and no additional analog circuitry i.e., purely digital implementation on top of existing Baud-rate CDR 212 implementations may be used.

Figure 5:
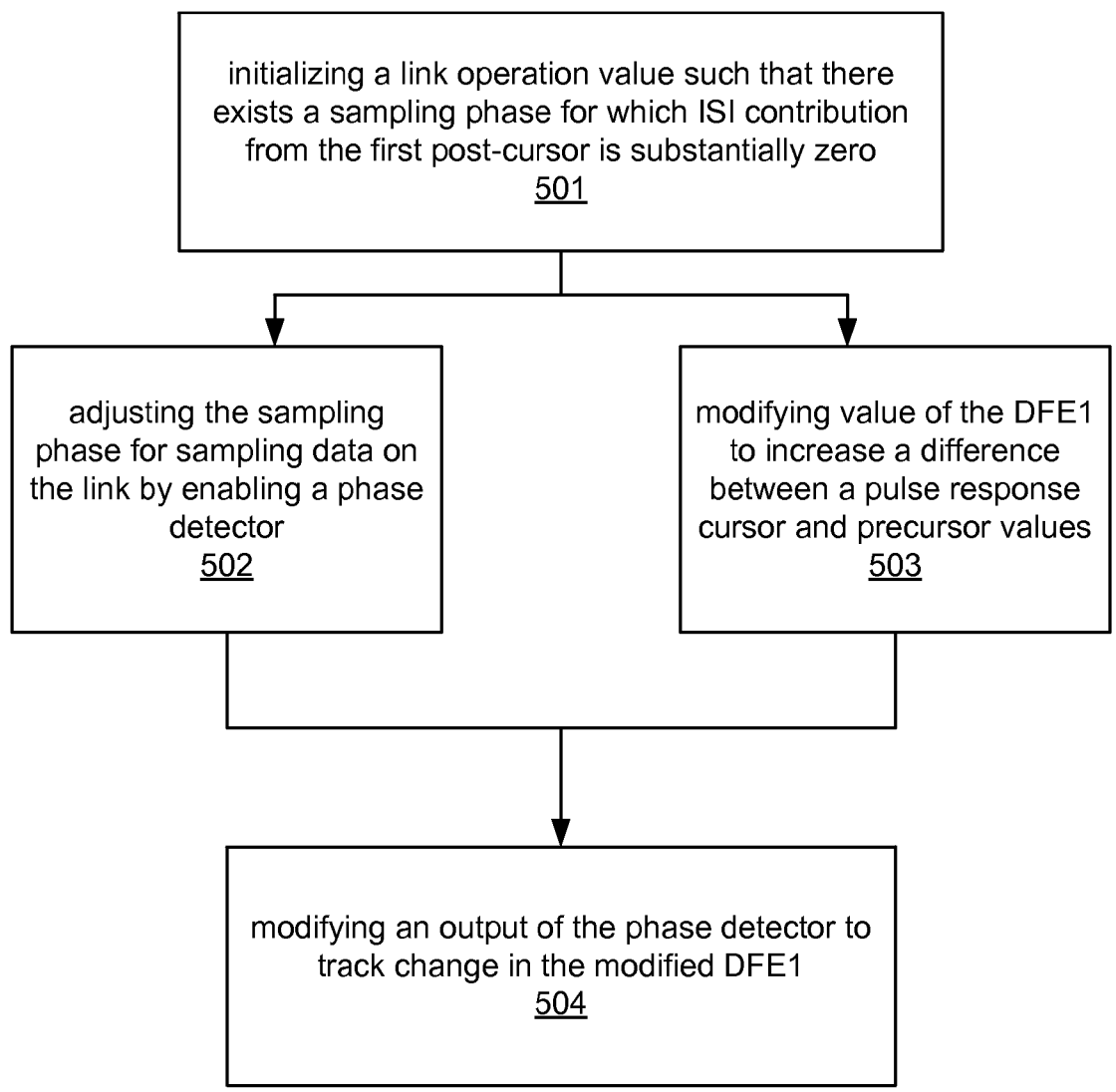
FIG. 5 illustrates a method flowchart for combined loop adaptation of the CDR, according to one embodiment of the disclosure.

FIG. 5 illustrates a method flowchart 500 for combined loop adaptation of the CDR 212, according to one embodiment of the disclosure. Although the blocks in the flowcharts with reference to FIG. 5 are shown in a particular order, the order of the actions can be modified. Thus, the illustrated embodiments can be performed in a different order, and some actions/blocks may be performed in parallel. Some of the blocks and/or operations listed in FIG. 5 are optional in accordance with certain embodiments. The numbering of the blocks presented is for the sake of clarity and is not intended to prescribe an order of operations in which the various blocks must occur. Additionally, operations from the various flows may be utilized in a variety of combinations.

In one embodiment, flowchart 500 is implemented in hardware description language (e.g., Verilog, VHDL) and synthesized into logic. At block 501, a link operation value is initialized such that there exists a sampling phase for which ISI contribution from the first post-cursor is substantially zero. At block 502, in response to initializing, the sampling phase for sampling data on the link is adjusted by enabling a phase detector. At block 503, value of the DFE1 is modified to increase a difference between a pulse response cursor and precursor values. In one embodiment, blocks 502 and 503 are executed in parallel. At block 504, an output of the phase detector is modified to track change in the modified DFE1.

FIG. 6 illustrates a method flowchart 600 for dynamically setting the value of DFE1 by computing the derivative of the difference between the cursor and the pre-cursor, according to one embodiment of the disclosure. Although the blocks in the flowcharts with reference to FIG. 6 are shown in a particular order, the order of the actions can be modified. Thus, the illustrated embodiments can be performed in a different order, and some actions/blocks may be performed in parallel. Some of the blocks and/or operations listed in FIG. 6 are optional in accordance with certain embodiments. The numbering of the blocks presented is for the sake of clarity and is not intended to prescribe an order of operations in which the various blocks must occur. Additionally, operations from the various flows may be utilized in a variety of combinations.

Flowchart 600 is a process for derivative DFE that can be programmed into a hardware description language (e.g., Verilog) to generate the hardware associated with the process. At block 601, derivative accumulator is initialized to zero, and dfe1_step is initialized to +1. At block 602, UI counter is reset to zero, sign for dfe1_step is changed, and DFE1 value is changed by dfe1_step. At block 603, the derivative counter (i.e. accumulator) is updated with a product of dfe1_step, data filter (mask), and sign of Error. At block 604, a determination is made wither the absolute value of the derivative accumulator is greater than a threshold. If the determination is an affirmative (i.e., yes) then the process proceeds to block 605, otherwise the process proceeds to block 606. At block 605, DFE1 value is updated based on the sign of the derivative accumulator, and then the process proceeds to block 606. At block 606, a determination is made whether the UI counter value is greater then a number of UI per DFE1 toggle. If the determination is an affirmative, the process proceeds to block 602, otherwise the process proceeds to block 603.

Figure 7:
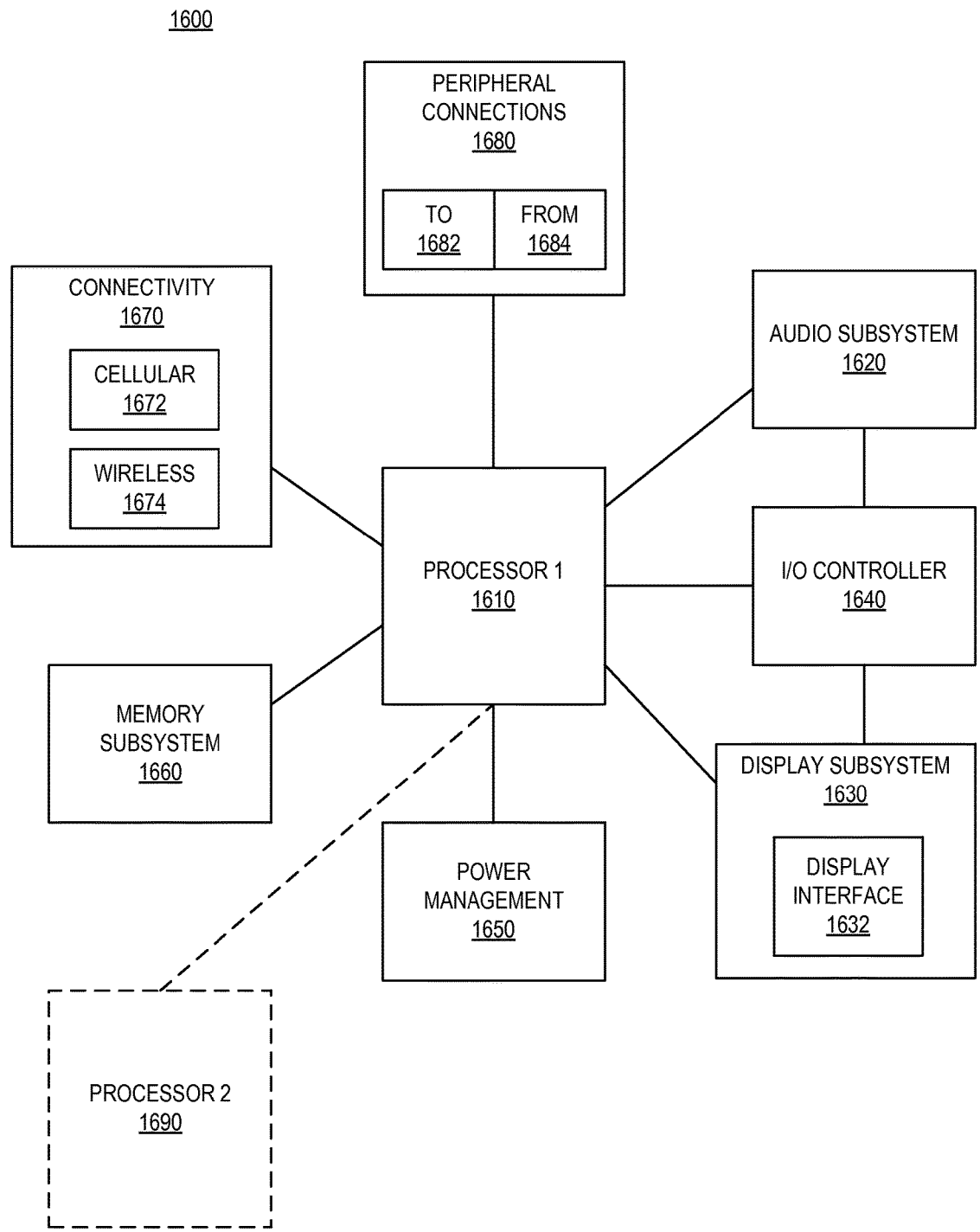
FIG. 7 is a smart device or a computer system or a SoC (System-on-Chip) with apparatus for baud rate timing recovery, according to one embodiment of the disclosure.

FIG. 7 is a smart device or a computer system or a SoC (System-on-Chip) with apparatus for baud rate timing recovery, according to one embodiment of the disclosure. It is pointed out that those elements of FIG. 7 having the same reference numbers (or names) as the elements of any other figure can operate or function in any manner similar to that described, but are not limited to such.

FIG. 7 illustrates a block diagram of an embodiment of a mobile device in which flat surface interface connectors could be used. In one embodiment, computing device 1600 represents a mobile computing device, such as a computing tablet, a mobile phone or smart-phone, a wireless-enabled e-reader, or other wireless mobile device. It will be understood that certain components are shown generally, and not all components of such a device are shown in computing device 1600.

In one embodiment, computing device 1600 includes a first processor 2 1610 with apparatus for baud rate timing recovery described with reference to embodiments. Other blocks of the computing device 1600 may also include with apparatus for baud rate timing recovery described with reference to embodiments. The various embodiments of the present disclosure may also comprise a network interface within 1670 such as a wireless interface so that a system embodiment may be incorporated into a wireless device, for example, cell phone or personal digital assistant.

In one embodiment, processor 1610 (and processor 2 1690) can include one or more physical devices, such as microprocessors, application processors, microcontrollers, programmable logic devices, or other processing means. Processor 1690 may be optional. The processing operations performed by processor 1610 include the execution of an operating platform or operating system on which applications and/or device functions are executed. The processing operations include operations related to I/O (input/output) with a human user or with other devices, operations related to power management, and/or operations related to connecting the computing device 1600 to another device. The processing operations may also include operations related to audio I/O and/or display I/O.

In one embodiment, computing device 1600 includes audio subsystem 1620, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into computing device 1600, or connected to the computing device 1600. In one embodiment, a user interacts with the computing device 1600 by providing audio commands that are received and processed by processor 1610.

Display subsystem 1630 represents hardware (e.g., display devices) and software (e.g., drivers) components that provide a visual and/or tactile display for a user to interact with the computing device 1600. Display subsystem 1630 includes display interface 1632, which includes the particular screen or hardware device used to provide a display to a user. In one embodiment, display interface 1632 includes logic separate from processor 1610 to perform at least some processing related to the display. In one embodiment, display subsystem 1630 includes a touch screen (or touch pad) device that provides both output and input to a user.

I/O controller 1640 represents hardware devices and software components related to interaction with a user. I/O controller 1640 is operable to manage hardware that is part of audio subsystem 1620 and/or display subsystem 1630. Additionally, I/O controller 1640 illustrates a connection point for additional devices that connect to computing device 1600 through which a user might interact with the system. For example, devices that can be attached to the computing device 1600 might include microphone devices, speaker or stereo systems, video systems or other display devices, keyboard or keypad devices, or other I/O devices for use with specific applications such as card readers or other devices.

As mentioned above, I/O controller 1640 can interact with audio subsystem 1620 and/or display subsystem 1630. For example, input through a microphone or other audio device can provide input or commands for one or more applications or functions of the computing device 1600. Additionally, audio output can be provided instead of, or in addition to display output. In another example, if display subsystem 1630 includes a touch screen, the display device also acts as an input device, which can be at least partially managed by I/O controller 1640. There can also be additional buttons or switches on the computing device 1600 to provide I/O functions managed by I/O controller 1640.

In one embodiment, I/O controller 1640 manages devices such as accelerometers, cameras, light sensors or other environmental sensors, or other hardware that can be included in the computing device 1600. The input can be part of direct user interaction, as well as providing environmental input to the system to influence its operations (such as filtering for noise, adjusting displays for brightness detection, applying a flash for a camera, or other features).

In one embodiment, computing device 1600 includes power management 1650 that manages battery power usage, charging of the battery, and features related to power saving operation. Memory subsystem 1660 includes memory devices for storing information in computing device 1600. Memory can include nonvolatile (state does not change if power to the memory device is interrupted) and/or volatile (state is indeterminate if power to the memory device is interrupted) memory devices. Memory subsystem 1660 can store application data, user data, music, photos, documents, or other data, as well as system data (whether long-term or temporary) related to the execution of the applications and functions of the computing device 1600.

Elements of embodiments are also provided as a machine-readable medium (e.g., memory 1660) for storing the computer-executable instructions (e.g., instructions to implement any other processes discussed herein). The machine-readable medium (e.g., memory 1660) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity 1670 includes hardware devices (e.g., wireless and/or wired connectors and communication hardware) and software components (e.g., drivers, protocol stacks) to enable the computing device 1600 to communicate with external devices. The computing device 1600 could be separate devices, such as other computing devices, wireless access points or base stations, as well as peripherals such as headsets, printers, or other devices.

Connectivity 1670 can include multiple different types of connectivity. To generalize, the computing device 1600 is illustrated with cellular connectivity 1672 and wireless connectivity 1674. Cellular connectivity 1672 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 1674 refers to wireless connectivity that is not cellular, and can include personal area networks (such as Bluetooth, Near Field, etc.), local area networks (such as Wi-Fi), and/or wide area networks (such as WiMax), or other wireless communication.

Peripheral connections 1680 include hardware interfaces and connectors, as well as software components (e.g., drivers, protocol stacks) to make peripheral connections. It will be understood that the computing device 1600 could both be a peripheral device ("to" 1682) to other computing devices, as well as have peripheral devices ("from" 1684) connected to it. The computing device 1600 commonly has a "docking" connector to connect to other computing devices for purposes such as managing (e.g., downloading and/or uploading, changing, synchronizing) content on computing device 1600. Additionally, a docking connector can allow computing device 1600 to connect to certain peripherals that allow the computing device 1600 to control content output, for example, to audiovisual or other systems.

In addition to a proprietary docking connector or other proprietary connection hardware, the computing device 1600 can make peripheral connections 1680 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

For example, an apparatus is provided which comprises: a Decision Feedback Equalizer (DFE); and a phase detector, operationally coupled to the DFE, to set a sampling phase based on a first post-cursor value of a composite pulse response being substantially equal to zero when the phase detector collects data bits having current bit and next bit such that a value of the current bit is unequal to a value of the next bit. In one embodiment, the apparatus further comprises logic to initialize a first post-cursor value of the DFE to a non-zero value. In one embodiment, the logic is operable to control the first post-cursor value of the DFE when the phase detector is enabled. In one embodiment, the logic is operable to determine the first post-cursor value of the DFE. In one embodiment, the logic is operable to determine the first post-cursor value of the DFE using at least one of: SSLMS or zero-forcing; Bit error based, or Means Square Error.

In one embodiment, the phase detector to generate a timing error estimate which is subject to a filtering factor which is represented by a difference between the current bit and the next bit. In one embodiment, the apparatus further comprises another phase detector to set an initial sampling phase based on equating a pulse response based precursor value and post-cursor value. In one embodiment, the other phase detector generates a timing error estimate which is of MMA timing error estimate or a Qureshi timing error estimate. In one embodiment, the apparatus further comprises logic to sequence operation of a clock data recovery such that the other phase detector to operate prior to operation of the phase detector. In one embodiment, the phase detector generates a timing error estimate which is a modified MMB timing error estimate.

In another example, a method for sampling data on a link is provided. In one embodiment, the method comprises: initializing a link operation value such that there exists a sampling phase for which ISI contribution from a first post-cursor is substantially zero; adjusting, in response to initializing, the sampling phase for sampling data on the link by enabling a phase detector; and modifying value of the DFE first post cursor to increase a difference between a pulse response cursor and precursor values; and modifying an output of the phase detector to track change in the modified DFE first post cursor value.

In one embodiment, the phase detector to generate a timing error estimate which is subject to a filtering factor which is represented by a difference between a current bit and a next bit of data bits received by on the link. In one embodiment, the initialization is performed by another phase detector to generate a timing error estimate. In one embodiment, the other phase detector to generate the timing error estimate using one of MMA timing error estimate or Qureshi timing error estimate. In one embodiment, the phase detector to generate a timing error estimate which is a modified MMB timing error estimate.

In another example, a system is provided which comprises: a memory unit; a processor, coupled to the memory unit, the processor comprising: a receiver configured to receive data from a transmitter, the receiver comprising: a Decision Feedback Equalizer (DFE); and a phase detector, operationally coupled to the DFE, to collect at least two data bits, having current bit and next bit such that value of the current bit is unequal to a value of the next bit, wherein the phase detector to set a sampling phase based on a pulse response based post-cursor value being substantially equal to zero; and a wireless interface for allowing the processor to communicate with another device.

In one embodiment, the receiver further comprises logic to initialize a first post-cursor value of the DFE to a non-zero value. In one embodiment, the logic is operable to control the first post-cursor value of the DFE when the phase detector is enabled. In one embodiment, the logic is operable to determine the first post-cursor value of the DFE. In one embodiment, the receiver further comprises another phase detector to set an initial sampling phase based on equating a pulse response based precursor value and post-cursor value.

In another example, an apparatus is provided which comprises: means for initializing a link operation value such that there exists a sampling phase for which ISI contribution from a first post-cursor is substantially zero; means for adjusting, in response to initializing, the sampling phase for sampling data on the link by enabling a phase detector; means for modifying value of the DFE first post cursor to increase a difference between a pulse response cursor and precursor values; and means for modifying an output of the phase detector to track change in the modified DFE first post cursor value.

In one embodiment, the apparatus further comprises means to generate a timing error estimate which is subject to a filtering factor which is represented by a difference between a current bit and a next bit of data bits received by on the link. In one embodiment, the initialization is performed by another phase detector to generate a timing error estimate. In one embodiment, the other phase detector to generate the timing error estimate using one of Mueller-Muller Type A timing error estimate or Qureshi timing error estimate. In one embodiment, the phase detector to generate a timing error estimate which is a modified Mueller-Muller Type B timing error estimate.

In another example, a method is provided which comprises: setting, by a phase detector which operationally coupled to a DFE, a sampling phase based on a first post-cursor value of a composite pulse response being substantially equal to zero when the phase detector collects data bits having current bit and next bit such that a value of the current bit is unequal to a value of the next bit. In one embodiment, the method further comprises initializing a first post-cursor value of the DFE to a non-zero value. In one embodiment, the method further comprises: controlling the first post-cursor value of the DFE when the phase detector is enabled.

In one embodiment, the method further comprises determining the first post-cursor value of the DFE. In one embodiment, the method further comprises: determining the first post-cursor value of the DFE using at least one of: SSLMS or zero-forcing; Bit error based, or Means Square Error. In one embodiment, the method further comprises generating by the phase detector a timing error estimate which is subject to a filtering factor which is represented by a difference between the current bit and the next bit. In one embodiment, the method further comprises setting by another phase detector an initial sampling phase based on equating a pulse response based precursor value and post-cursor value.

In one embodiment, the method further comprises generating by the other phase detector a timing error estimate which is of Mueller-Muller Type A timing error estimate or a Qureshi timing error estimate. In one embodiment, the method further comprises sequencing operation of a clock data recovery such that the other phase detector to operate prior to operation of the phase detector. In one embodiment, the method further comprises generating, by the phase detector, a timing error estimate which is a modified Mueller-Muller Type B timing error estimate.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:
1. An apparatus comprising:
   a decision feedback equalizer;
   a first phase detector, operationally coupled to the decision feedback equalizer, to set a sampling phase based on a first post-cursor value of a composite pulse response being substantially equal to zero when the first phase detector collects data bits having a current bit and a next bit such that a value of the current bit is unequal to a value of the next bit; and a second phase detector to set initial conditions for operation of the first phase detector, wherein the first post-cursor value of the decision feedback equalizer is periodically updated to estimate a derivative between a current cursor and a pre-cursor of the composite pulse response.

2. The apparatus of claim 1 further comprises logic to initialize the first post-cursor value of the decision feedback equalizer to a non-zero value.

3. The apparatus of claim 2, wherein the logic is operable to control the first post-cursor value of the decision feedback equalizer when the first phase detector is enabled.

4. The apparatus of claim 2, wherein the logic is operable to determine the first post-cursor value of the decision feedback equalizer.

5. The apparatus of claim 4, wherein the logic is operable to determine the first post-cursor value of the decision feedback equalizer using at least one of:

sign-sign least mean square;
zero-forcing;
bit error based; and
means square error.

6. The apparatus of claim 1, wherein the first phase detector to generate a timing error estimate which is subject to a filtering factor which is represented by a difference between the current bit and the next bit.

7. The apparatus of claim 1, wherein the second phase detector to set an initial sampling phase based on equating a pulse response pre-cursor value and post-cursor value.

8. The apparatus of claim 7, wherein the second phase detector to generate a timing error estimate which is one of Mueller-Muller Type A timing error estimate and a Qureshi timing error estimate.

9. The apparatus of claim 7 further comprises logic to sequence operation of a clock data recovery such that the second phase detector to operate prior to operation of the first phase detector.

10. The apparatus of claim 1, wherein the first phase detector to generate a timing error estimate which is a modified Mueller-Muller Type B timing error estimate.

11. A method for sampling data on a link, the method comprising:

initializing a link operation value such that there exists a sampling phase for which inter-symbol interference contribution from a first post-cursor is substantially zero;

adjusting, in response to the initialization, the sampling phase for sampling data on the link by enabling a first phase detector, modifying a value of a decision feedback equalizer first post-cursor to increase a difference between a pulse response cursor and pre-cursor values; and modifying an output of the first phase detector to track change in the modified value, wherein the initialization is performed by a second phase detector to generate a timing error estimate for operation of the first phase detector, and wherein the value of the decision feedback equalizer is periodically updated to estimate a derivative between a current cursor and a pre-cursor of the pulse response.

12. The method of claim 11, wherein the first phase detector to generate a timing error estimate which is subject to a filtering factor which is represented by a difference between a current bit and a next bit of data bits received on the link.

13. The method of claim 1, wherein the second phase detector to generate the timing error estimate using one of Mueller-Muller Type A timing error estimate and Qureshi timing error estimate.

14. The method of claim 11, wherein the first phase detector to generate a timing error estimate which is a modified Mueller-Muller Type B timing error estimate.

15. A system comprising:

a memory unit;
a processor, coupled to the memory unit, the processor comprising:
a receiver configured to receive data from a transmitter, the receiver comprising:
a decision feedback equalizer;
a first phase detector, operationally coupled to the decision feedback equalizer, to collect at least two data bits, having a current bit and a next bit such that a value of the current bit is unequal to a value of the next bit, wherein the first phase detector to set a sampling phase based on a pulse response based a first post-cursor value being substantially equal to zero;
a second phase detector to set initial conditions for operation of the first phase detector; and
a wireless interface for allowing the processor to communicate with another device, wherein the first post-cursor value of the decision feedback equalizer is periodically updated to estimate a derivative between a current cursor and a pre-cursor of the pulse response.

16. The system of claim 15, wherein the receiver further comprises logic to initialize the first post-cursor value of the decision feedback equalizer to a non-zero value.

17. The system of claim 16, wherein the logic is operable to control the first post-cursor value of the decision feedback equalizer when the first phase detector is enabled.

18. The system of claim 17, wherein the logic is operable to determine the first post-cursor value of the decision feedback equalizer.

19. The system of claim 15, wherein the second phase detector to set an initial sampling phase based on equating a pulse response based pre-cursor value and post-cursor value.

* * * * *